US008397254B2

(12) United States Patent
E et al.

(10) Patent No.: US 8,397,254 B2
(45) Date of Patent: Mar. 12, 2013

(54) BROADCASTING SYSTEM WITH AUTO PROGRAMMING AND VIEWER NUMBER FEEDBACK

(75) Inventors: Shin-Zhi E, Tainan (TW); Chun-Wen Cheng, Tainan (TW); Ling-Yan Lin, Tainan (TW); Chung-Hsun Yang, Tainan (TW); Feng-Yuan Chen, Tainan (TW); Chih-Jian Ma, Tainan (TW)

(73) Assignee: Chi Lin Technology Co., Ltd., Tainan (TW)

( * ) Notice: Subject to any disclaimer, the term of this patent is extended or adjusted under 35 U.S.C. 154(b) by 0 days.

(21) Appl. No.: 13/306,058

(22) Filed: Nov. 29, 2011

(65) Prior Publication Data

US 2012/0137324 A1 May 31, 2012

(30) Foreign Application Priority Data

Nov. 30, 2010 (TW) .............................. 99141606 A

(51) Int. Cl.
*H04N 7/10* (2006.01)

(52) U.S. Cl. ........................................... 725/32; 725/35

(58) Field of Classification Search ..................... 725/32
See application file for complete search history.

(56) References Cited

U.S. PATENT DOCUMENTS 8,127,328 B2 * 2/2012 Jacobs ........................... 725/36
2002/0083439 A1 * 6/2002 Eldering ......................... 725/32
2003/0070167 A1 * 4/2003 Holtz et al. ..................... 725/32
2004/0267806 A1 * 12/2004 Lester ....................... 707/103 R
2007/0282682 A1 12/2007 Dietz et al.
2008/0059994 A1 3/2008 Thornton et al.
2008/0147488 A1 6/2008 Tunick et al.
2009/0132339 A1 * 5/2009 Sloo et al. ...................... 705/10

FOREIGN PATENT DOCUMENTS

| | | |
|---|---|---|
| TW | 594612 | 6/2004 |
| TW | 200830198 | 7/2008 |
| TW | 200844922 | 11/2008 |
| TW | M375973 | 3/2010 |

* cited by examiner

*Primary Examiner* — Vivek Srivastava
*Assistant Examiner* — Junior Mendoza
(74) *Attorney, Agent, or Firm* — WPAT, P.C.; Anthony King

(57) ABSTRACT

A broadcasting system with auto programming and viewer number feedback is provided, which includes a data gathering device, a viewer number calculating device and a program auto-scheduling device. The data gathering device is used to gather a program list and a local viewer number data. The viewer number calculating device is used to calculate a local viewer number. The program auto-scheduling device is used to automatically determine whether to adjust a program schedule of the program list according to a comparison result between the local viewer number and a determined viewer number. Therefore, the broadcasting system of the invention can detect viewer and definitely calculate viewing efficiency within a predetermined status, and can precisely quantify the viewing efficiency using the caught data. Additionally, the broadcasting system of the invention can automatically evaluate whether to reschedule of a program according to the data feedback to conform the predetermined viewer status.

11 Claims, 1 Drawing Sheet

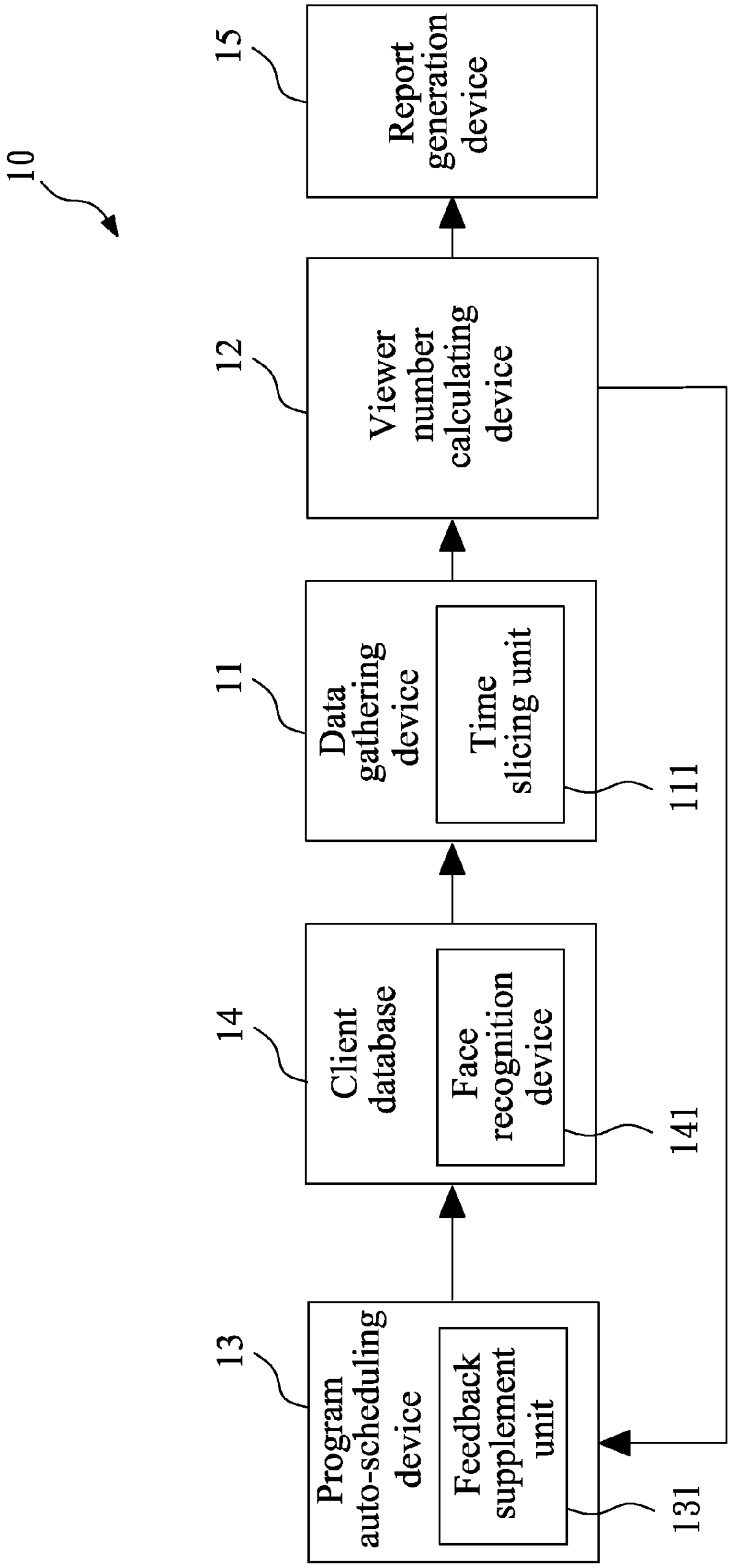
10
13
Program auto-scheduling device
Feedback supplement unit
131
14
Client database
Face recognition device
141
11
Data gathering device
Time slicing unit
111
12
Viewer number calculating device
15
Report generation device

BROADCASTING SYSTEM WITH AUTO PROGRAMMING AND VIEWER NUMBER FEEDBACK

BACKGROUND OF THE INVENTION

1. Field of the Invention

The present invention relates to a broadcasting system, and in particular, to a broadcasting system with auto programming and viewer number feedback.

2. Description of the Related Art

Taiwan Patent Publication No. 594612 entitled "multimedia electronic advertisement board system" discloses a conventional multimedia electronic advertisement board system that integrates the network multimedia technology and a webpage interface into a common platform, so that the multimedia advertisement files can be transferred to an electronic board terminal via the network, and the multimedia advertisement files do not need to be transferred and played by humans Moreover, the system plays the advertisement by the webpage interface and does not need recording in advance and can broadcast the local Live program at all times. In addition, the webpage supports multiple formats of media, e.g. Flash and dynamic GIF files, thus greatly saving the fabricating cost of the advertisement providers.

However, the conventional multimedia electronic advertisement board system cannot acquire the viewing status to adjust the schedule of the broadcasted advertisement. Additionally, companies who survey or purchase media usually have an ambiguous explanation on the viewer number of a digital board at present and the current efficiency measurement mechanism is mostly to measure the viewing efficiency of a media platform of the digital board by a traditional survey method which is easy to distort the viewing efficiency of the media platform of the digital board. Therefore, the broadcasting network of the digital board generally lacks of a mature and quantified index for viewing efficiency.

Therefore, it is necessary to provide a broadcasting system with auto-programming and viewer number feedback to solve the above problems.

SUMMARY OF THE INVENTION

The present invention provides a broadcasting system with auto-programming and viewer number feedback. The broadcasting system includes a data gathering device, a viewer number calculating device and a program auto-scheduling device. The data gathering device is used to gather a program list and a local viewer number data within a first determined time period on time basis. The viewer number calculating device is used to calculate a local viewer number corresponding to at least one determined program in the program list within the first determined time period according to the local viewer number data. The program auto-scheduling device is used to automatically determine whether to adjust a program schedule of the program list within a second determined time period according to a comparison result between the local viewer number and a determined viewer number.

The broadcasting system of the invention can detect viewer and definitely calculate viewing efficiency within a predetermined status, and can precisely quantify the viewing efficiency using the caught data. Additionally, the broadcasting system of the invention can automatically evaluate whether to reschedule of a program according to the data feedback to conform the predetermined viewerstatus.

BRIEF DESCRIPTION OF THE DRAWINGS

The invention will be described according to the appended drawings in which:

FIG. 1 illustrates a schematic view of a broadcasting system with auto programming and viewer number feedback of the present invention.

PREFERRED EMBODIMENT OF THE PRESENT INVENTION

Referring to FIG. 1, it illustrates a schematic view of a broadcasting system with auto programming and viewer number feedback of the present invention. According to the present invention, the broadcasting system 10 can evaluate whether to increase playing times of a program based on a feedback, and includes a data gathering device 11, a viewer number calculating device 12, an program auto-scheduling device 13, and a client database 14. The data gathering device 11 is used to gather a program list and a local viewer number data within a first determined time period on time basis. In this embodiment, the first determined time period can be flexibly adjusted, and the minimal unit of the first determined time period is one hour which can be determined and adjusted by this system 10.

A user can use a host or the program auto-scheduling device 13 via the network to determine a customized broadcasting period (predetermined total time period), a predetermined total viewer number, a broadcasting start date, a predetermined total time period, determined programs and the program list, thereby obtaining a determined viewer number.

In this embodiment, the first determined time period is 1 day, and the program list is, for example, a program A, a program B, a program C, a program D, a program E and a program F which are sequentially broadcasted in cycles. A determined program is the program B. The data gathering device 11 can be used to obtain the determined program (the program B) and a local viewer number corresponding to the determined program.

Therefore, in this embodiment, the determined viewer number is calculated based on the following formula:

determined viewer number=(predetermined total viewer number−obtained total local viewer number)/(predetermined total time period−broadcasted determined time period (days)).

In other words, the determined viewer number is an expected viewer number per day of the broadcasting system with auto programming and viewer number feedback of the present invention, and can be automatically fed back to a feedback supplement unit 131 of the program auto-scheduling device 13 according to the broadcasted determined time period (days) and the obtained total local viewer number (viewer number), thereby maintaining or the adjusting a program schedule in a next day according to a result of feedback data, for example, increasing the program playing times, or maintaining the original determined program schedule.

Since the time of playing the determined program (the program B) can be distributed in different time units within the first determined time period (1 day), the data gathering device 11 further includes a time slicing unit 111, for slicing the program list and the local viewer number data within the first determined time period on time basis. For example, the data is sliced based on a time unit such as 15 minutes, 30 minutes or 1 hour. By using the time slicing unit 111, the at least one determined program (the program B) relative to the program list and the local viewer number data, the local viewer number (e.g. 50 viewers) corresponding to the at least one determined program and a local passing number (e.g. 100 viewers) corresponding to the at least one determined program in the time unit (e.g. 15 minutes) can be obtained.

The broadcasting system 10 of the present invention further includes at least one client database 14, for storing the at least one program list, the at least one local viewer number data, and the at least one local passing number and a client identifier.

Moreover, the client database 14 further includes a face recognition device 141, for calculating and obtaining the local viewer number and the local passing number. In this embodiment, the local viewer number is calculated on a basis that the face is right towards a playing screen for more than 2 seconds. The local passing number refers to the viewers passing the playing screen but not watching the playing screen.

The viewer number calculating device 12 is used to calculate the local viewer number corresponding to at least one determined program of the program list within the first determined time period according to the local viewer number data. In this embodiment, the viewer number calculating device 12 calculate a sum of the local viewer numbers corresponding to the determined program within the first determined time period according to the local viewer numbers corresponding to the local viewer number data of the determined program. Since the determined program can be played multiple times within the first determined time period (1 day), and after being calculated by the time slicing unit 111, the determined program (the program B), the local viewer number corresponding to the determined program (the program B), and the local passing number corresponding to the determined program (the program B) in each time unit (e.g. 15 minutes) can be obtained. Therefore, a sum of the local viewer numbers corresponding to the determined program within the first determined time period can be calculated.

The program auto-scheduling device 13 is used to automatically determine whether to adjust a program schedule of the program list within a second determined time period by using the feedback supplement unit 131 according to a comparison result between the local viewer number and a determined viewer number. The determined viewer number is obtained by (customized total viewer number−obtained total local viewer number)/(predetermined total time period (days)−broadcasted determined time period (days)). Likewise, in this embodiment, the second determined time period can be a secondary broadcasting period, which can be determined and adjusted by this system 10. If the program list and the local viewer number data within the first determined time period is the program list and local viewer number data of a previous day, after calculation by this system, the program schedule within the second determined time period is the program schedule of a next day.

When the local viewer number of the determined program (the program B) is smaller than the determined viewer number, it indicates that the number does not reach a determined value (the determined viewer number) expected by an advertisement or program client. Then, the program auto-scheduling device 13 increases the program schedule of the determined program (the program B) in the program list within the second determined time period according to a weight value (%) corresponding to times of supplement. Here, the times of supplement can be determined by the user and the weight value corresponding to the times of supplement can be adjusted freely. The weight value can be obtained according to the following formula:

weight value (%)=((((predetermined total viewer number−obtained total local viewer number)/(predetermined total time period−broadcasted determined time period))−local viewer number corresponding to determined program within a determined time period)/((predetermined total viewer number−obtained total local viewer number)/(predetermined total time period−broadcasted determined time period)))×100%.

When the local viewer number of the determined program (the program B) is greater than or equal to the determined viewer number, it indicates that the number has reached the determined value expected by the advertisement or program client. Then, the program auto-scheduling device 13 arranges the program schedule of the determined program in the program list within the second determined time period according to the program schedule of the determined program in the program list within the first determined time period, that is, the program schedule of the determined program remains unchanged. Or, the program schedule within the second determined time period is an original automatically arranged program schedule and does not need the supplement.

The broadcasting system 10 of the present invention further includes a report generation device 15, for outputting the data in the client database 14 according to the client identifier. The report generation device 15 can output the data in the client database 14 according to a customized data output amount.

Hereinafter, an exemplary embodiment is provided for illustrating the present invention in detail, and should not be regarded as the limitation to the present invention.

In an exemplary embodiment of the present invention, a percentage difference on the current day of the local viewer number (i.e. the actual viewer number on the current day) and the determined viewer number (i.e. the expected viewer number) within the first determined time period (1 day) is calculated as follows:

weight value (%) on the current day=((((predetermined total viewer number−obtained total local viewer number)/(predetermined total time period−broadcasted determined time period))−actual viewer number on the current day)/((predetermined total viewer number−obtained total local viewer number)/(predetermined total time period−broadcasted determined time period)))×100%.

Here, in this embodiment, the terminologies in the above formula are defined as follows:

1. the predetermined total viewer number: the total number of local viewers ordered by a client;

2. the determined total time period: the number of days ordered by the client;

3. the actual viewer number on the current day: the local viewer number on the current day calculated by the present invention, i.e. the local viewer number corresponding to the determined program within a determined time period (days);

4. the obtained total local viewer number: the calculated total number of local viewers; and 5. the broadcasted determined time period: the days during which the broadcasting is completed.

In this embodiment, if the standard program playing times are 3 times per hour. The client can designate the total viewer number and the broadcasting days or just designate one of them. If the client designates the total viewer number and the broadcasting days, the expected viewer number per day on average can be calculated based on (total viewer number/broadcasting days), and the expected viewer number can be re-calculated once every day.

For example, the client designated that the total viewer number is 30000 and the broadcasting must be done within one week (the broadcasting days=7), the viewer number must be 30000/7=4286 (the determined viewer number) on the first day. If after the broadcasting on the first day is ended, the system of the present invention calculates the actual viewer number (the local viewer number) on the current day is 5000 (>the determined viewer number 4286, the supplement is not required), the calculated viewer number on the second day can be calculated and needs to reach (30000−5000)/(7−1)=4167.

If after the broadcasting on the first day is ended, the system of the present invention calculates the actual viewer number (the local viewer number) on the current day is 3000 (<the determined viewer number 4286,the supplement mechanism is actuated), after the supplement, the calculated viewer number on the second day can be calculated and needs to reach (30000−3000)/7−1)=4500.

The supplement mechanism is the standard program playing times plus the times of supplement, in which the relation of the times of supplement and a difference value (Weight Value) (%) on the current day is listed in the following table:

| | Weight Value (%) | | | | | | | | | |
|---|---|---|---|---|---|---|---|---|---|---|
| | 10 | 20 | 30 | 40 | 50 | 60 | 70 | 80 | 90 | 100 |
| Times of Supplement | 1 | 2 | 3 | 4 | 5 | 6 | 6 | 6 | 6 | 6 |

The upper limit of the times of supplement is (the standard program playing times ×2), so the maximum value in the above table of the embodiment is 6. According to the above example, if after the broadcasting on the first day is ended, the system of the present invention calculates the actual viewer number (the local viewer number) on the current day is 3000, the weight value (%) on the current day is calculated to be 30% ((4286−3000)/4286), and based on the above table, the times of supplement is 3. Therefore, the program playing times within the second determined time period are the standard program playing times (3) plus the times of supplement (3), i.e. broadcasting 6 times per hour.

The broadcasting system with auto programming and viewer number feedback of the present invention can precisely evaluate the viewing efficiency, properly quantify the viewing efficiency by using the caught data, and flexibly adjust the program playing times according to the quantified viewing efficiency to conform the determined viewer status.

Although the present invention has been disclosed with reference to the above embodiments, these embodiments are not intended to limit the present invention. It will be apparent to those skilled in the art that various modifications and variations can be made without departing from the scope or spirit of the present invention. Therefore, the scope of the present invention shall be defined by the appended claims.

What is claimed is:

1. A broadcasting system with auto programming and viewer number feedback, comprising:

a data gathering device, for gathering a program list and a local viewer number data within a first determined time period on time basis;

a viewer number calculating device, for calculating a local viewer number corresponding to at least one determined program of the program list within the first determined time period according to the local viewer number data;

and a program auto-scheduling device, for automatically determining whether to adjust a program schedule of the program list within a second determined time period according to a comparison result between the local viewer number and a determined viewer number;

if the local viewer number is smaller than the determined viewer number, the program auto-scheduling device increases the program schedule of the determined program in the program list within the second determined time period according to a weight value;

wherein the weight value is calculated based on the following formula:

weight value (%)=((((predetermined total viewer number−obtained total local viewer number)/(predetermined total time period−broadcasted determined time period))−local viewer number corresponding to the determined program within a determined time period)/((predetermined total viewer number−obtained total local viewer number)/(predetermined total time period−broadcasted determined time period)))×100%.

2. The broadcasting system according to claim 1, wherein the data gathering device is used to obtain the determined program and the local viewer number corresponding to the determined program.

3. The broadcasting system according to claim 2, wherein the data gathering device further comprises a time slicing unit for slicing the program list and the local viewer number data within the first determined time period on time basis, so as to obtain at least one determined program relative to the program list and the local viewer number data, the local viewer number corresponding to the at least one determined program and a local passing number corresponding to the at least one determined program.

4. The broadcasting system according to claim 3, wherein the viewer number calculating device calculates a sum of the local viewer numbers corresponding to the determined program within the first determined time period according to the local viewer numbers corresponding to the local viewer number data of the determined program.

5. The broadcasting system according to claim 3, further comprising a client database for storing the at least one program list, the at least one local viewer number data, the at least one local passing number, and a client identifier.

6. The broadcasting system according to claim 5, wherein the client database further comprises a face recognition device for calculating and obtaining the local viewer number and the local passing number.

7. The broadcasting system according to claim 5, further comprising a report generation device for outputting data in the client database according to the client identifier.

8. The broadcasting system according to claim 7, wherein the report generation device further outputs the data in the client database according to a customized data output amount.

9. The broadcasting system according to claim 1, wherein the program auto-scheduling device further comprises a feedback supplement unit, if the local viewer number is greater than or equal to the determined viewer number, the program auto-scheduling device does not reschedule of the determined program within the second determined time period.

10. The broadcasting system according to claim 1, wherein the program auto-scheduling device further determines a predetermined total viewer number, a broadcasting start date, a predetermined total time period, the determined programs and the program list, wherein the determined viewer number is calculated based on the following formula:

determined viewer number=(predetermined total viewer number−obtained total local viewer number)/(predetermined total time period−broadcasted determined time period).

11. The broadcasting system according to claim 10, wherein the program auto-scheduling device determines the predetermined total viewer number, the broadcasting start date, the predetermined total time period, the determined programs and the program list therein via a network.

* * * * *